US009955708B2

(12) United States Patent
Langford

(10) Patent No.: US 9,955,708 B2
(45) Date of Patent: May 1, 2018

(54) METHOD OF ENHANCING PALATABILITY OF A DIETARY SUPPLEMENT TO ANIMAL FOOD

(71) Applicant: Trident Seafoods Corporation, Seattle, WA (US)

(72) Inventor: Christopher J. Langford, Chehalis, WA (US)

(73) Assignee: Trident Seafoods Corporation, Seattle, WA (US)

( * ) Notice: Subject to any disclaimer, the term of this patent is extended or adjusted under 35 U.S.C. 154(b) by 329 days.

(21) Appl. No.: 14/255,837

(22) Filed: Apr. 17, 2014

(65) Prior Publication Data

US 2014/0227395 A1  Aug. 14, 2014

Related U.S. Application Data

(63) Continuation of application No. 13/262,205, filed as application No. PCT/US2010/029036 on Mar. 29, 2010, now abandoned.

(60) Provisional application No. 61/164,783, filed on Mar. 30, 2009, provisional application No. 61/286,236, filed on Dec. 14, 2009.

(51) Int. Cl.
| *A23K 1/16* | (2006.01) |
| *A23K 1/00* | (2006.01) |
| *A23K 1/175* | (2006.01) |
| *A23K 40/30* | (2016.01) |
| *A23K 20/158* | (2016.01) |
| *A23K 20/28* | (2016.01) |

(52) U.S. Cl.
CPC ............ *A23K 1/164* (2013.01); *A23K 20/158* (2016.05); *A23K 20/28* (2016.05); *A23K 40/30* (2016.05)

(58) Field of Classification Search
CPC ...... A23K 1/164; A23K 20/28; A23K 20/158; A23K 40/30
USPC ....................................... 426/61, 2, 302, 608
See application file for complete search history.

(56) References Cited

U.S. PATENT DOCUMENTS

| 3,594,187 A | 7/1971 | Liepa |
| 3,652,348 A | 3/1972 | Baum |
| 3,954,643 A | 5/1976 | Krings et al. |

(Continued)

FOREIGN PATENT DOCUMENTS

JP  2001238607 A  9/2001

OTHER PUBLICATIONS

"Antisettling Agent". Available online at www.sipernt.com on May 15, 2008.*

(Continued)

*Primary Examiner* — Erik Kashnikow
*Assistant Examiner* — Assaf Zilbering
(74) *Attorney, Agent, or Firm* — Stoel Rives LLP

(57) ABSTRACT

Fish oil is thickened using a thickening agent, such as one or both of silica and wax dispersed in the fish oil to thereby facilitate ease of delivery of the fish oil to an animal. The fish oil and the thickening agent form a viscous liquid blend that functions as a delivery medium of nutrients naturally present in the fish oil. The thickening agent is inert to the animal and chemically inert to the fish oil so that the naturally present nutrients of the fish oil are not substantially degraded by the thickening agent. The viscous liquid blend may also be used as a carrier liquid to deliver an added dietary supplement to the animal.

9 Claims, 4 Drawing Sheets

(56) References Cited

U.S. PATENT DOCUMENTS

| | | | |
|---|---|---|---|
| 4,584,197 A | | 4/1986 | Takasaki et al. |
| 4,874,629 A | | 10/1989 | Chang et al. |
| 4,996,072 A | | 2/1991 | Marschner et al. |
| 5,375,746 A | * | 12/1994 | Schaefer .............. B67D 7/0205 222/383.1 |
| 6,652,879 B2 | | 11/2003 | Opheim |
| 6,773,715 B1 | | 8/2004 | Yam |
| 7,214,400 B1 | * | 5/2007 | Zyzak .................... A23D 9/007 426/534 |
| 7,318,920 B2 | | 1/2008 | Christensen |
| 2004/0018223 A1 | | 1/2004 | Chen |
| 2004/0115246 A1 | | 6/2004 | Locatelli |
| 2004/0223956 A1 | * | 11/2004 | Naidu ................... A23L 1/3006 424/93.45 |
| 2005/0130937 A1 | | 6/2005 | Ben Dror et al. |
| 2007/0125269 A1 | | 6/2007 | Nishi |
| 2009/0214698 A1 | | 8/2009 | Topsoe et al. |

OTHER PUBLICATIONS

Byrd, "7 Fish Oil Benefits Proven by Research". Available online at http://ezinearticles.com on Jan. 11, 2007.

* cited by examiner

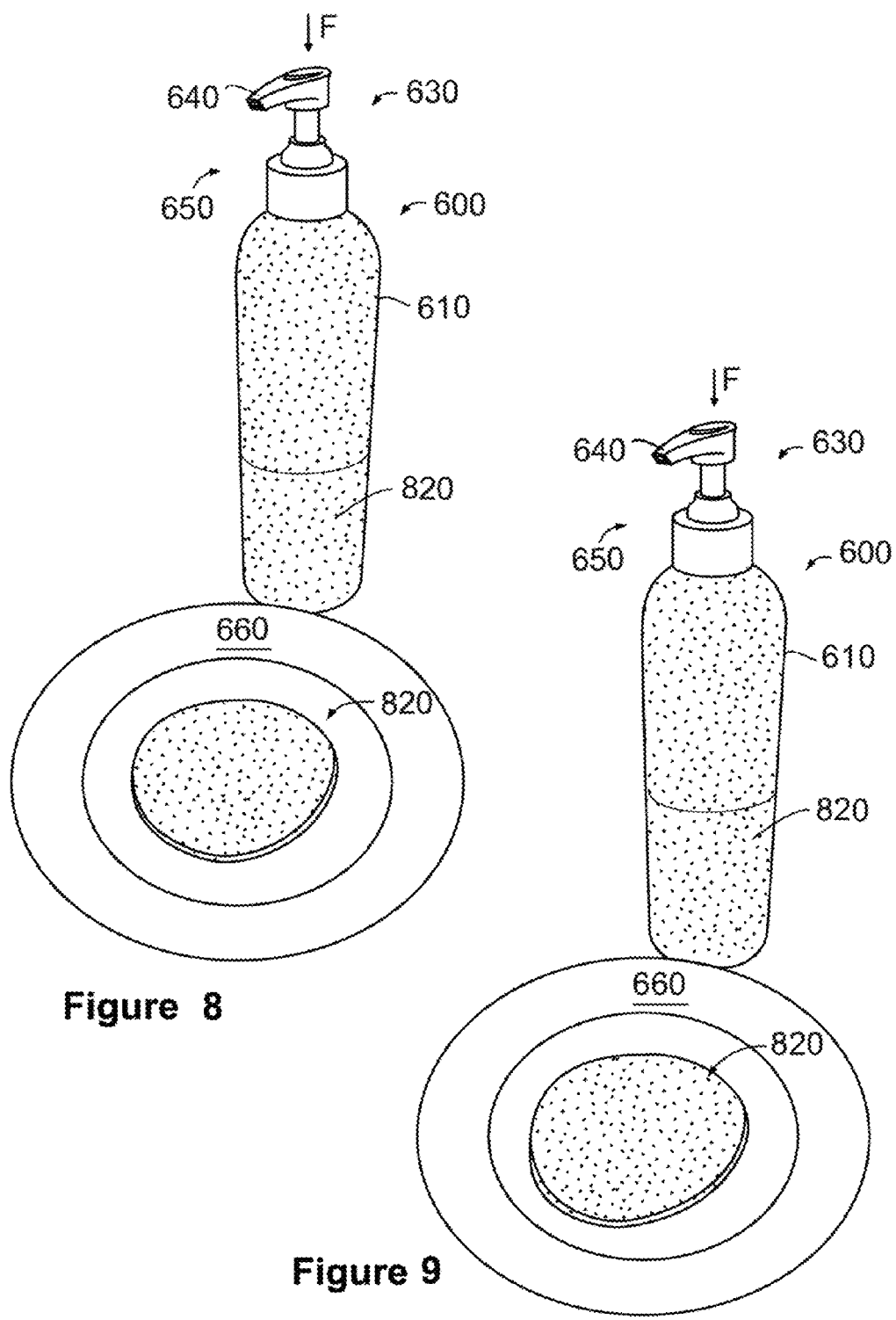

METHOD OF ENHANCING PALATABILITY OF A DIETARY SUPPLEMENT TO ANIMAL FOOD

RELATED APPLICATIONS

This application is a continuation of U.S. patent application Ser. No. 13/262,205, filed Sep. 29, 2011, abandoned, which is a 371 of International Application No. PCT/US2010/029036, filed Mar. 29, 2010, which claims benefit under 35 U.S.C. § 119(e) of U.S. Provisional Application No. 61/164,783, filed Mar. 30, 2009, and U.S. Provisional Application No. 61/286,236, filed Dec. 14, 2009.

TECHNICAL FIELD

This disclosure relates to a liquid dietary supplement for animals and, more particularly, to thickened fish oil as a delivering medium for either one or both of nutrients and additional dietary supplements added to the fish oil.

BACKGROUND INFORMATION

Fish oil confers many health benefits upon animals. For example, fish oil contains relatively high amounts of omega-3 fatty acids and other essential fatty acids that are normally not produced by an animal and instead must be ingested by the animal as part of a healthy diet. Although fish oil confers health benefits to animals, consumer acceptance of fish oil products may be adversely impacted by the offensive smell of fish oil to certain human beings. In addition, fish oil generally has at ambient temperature a very low viscosity, such as about 30-60 centipoise (cP), and may be messy to dispense by pumping, pouring, and squeezing due to the thin and runny nature of the fish oil.

Moreover, dietary supplements, such as glucosamine, chondroitin, methylsulfonylmethane (MSM), probiotics, prebiotics, and digestive enzymes, when ingested by an animal help to improve its health. Traditionally, dietary supplements for animals have been packaged and stored in a dry powdered form to prevent moisture from activating the supplement. The dry powder may be delivered in pill form to the animal or mixed into its food. For example, PBI/Gordon Corporation of Kansas City, Mo. sells a dietary supplement, ProZyme®, which includes the digestive enzyme alpha-amylase 2000 SKBU. ProZyme® is sold in a powdered form, which may have one or both of offensive smell and taste to the animal. Thus, ProZyme® may be difficult to deliver to the animal, even if the dietary supplement is mixed with the animal's food. Further, pills are challenging to deliver to animals, particularly if an animal has previously ingested a foul tasting or smelling pill.

U.S. Pat. No. 7,318,920 of Christensen describes using a soft chewable treat to deliver probiotics to an animal. However, the soft chewable treat has a water activity of about 0.60 to about 0.75, which can negatively impact the shelf life of the treat because activated probiotics may undesirably multiply in presence of moisture. In addition, the soft chewable treat may have one or both of offensive smell and taste to the animal, particularly if the probiotic has multiplied to undesirable levels due to the presence of moisture. Further, the soft chewable treat includes additional ingredients, such as starch, sugar, humectant, and a bulking agent. Thus, the treat may be of limited commercial viability due to the increased processing time and production costs.

Thus, the present inventor has recognized a need for improved systems and methods for delivering fish oil and dietary supplements to animals.

SUMMARY OF THE DISCLOSURE

In accordance with an embodiment, fish oil is thickened using a thickening agent, such as silica, wax, or a combination of both of them, dispersed in the fish oil to facilitate ease of delivery of the fish oil to an animal. The fish oil and the thickening agent form a viscous liquid blend that functions as a delivery medium of nutrients naturally present in the fish oil. The thickening agent is inert to the animal and chemically inert to the fish oil so that the naturally present nutrients of the fish oil are not substantially degraded by the thickening agent. The viscous liquid blend may also be used as a carrier liquid to deliver an additional dietary supplement, such as a bacillus subtilis probiotic or an alpha-amylase digestive enzyme, to the animal. The thickening agent is also chemically inert to the additional dietary supplement.

Skilled persons will appreciate in view of the teachings herein, certain embodiments may be capable, of achieving certain advantages, including by way of example and not limitation one or more of the following: (1) providing a palatable supplement mixture that is deliverable in a liquid form to an animal; (2) providing a system and method for at least partly encapsulating a dietary supplement to mask from an animal one or both of offensive smell and taste of the dietary supplement; (3) providing a system and method for at least partly encapsulating and protecting a dietary supplement from activation by moisture; (4) providing a system and method for enhancing an animal's ingestion of omega-3 fatty acids and other essential fatty acids; (5) providing a system and method for increasing the willingness of an animal to ingest dietary supplements; (6) providing a system and method for improving the health of an animal; (7) providing a system and method that allows an animal owner or caregiver to more easily administer dietary supplements to an animal; (8) providing a system and method for increasing the viscosity of fish oil; (9) providing a system and method for improving the suspendibility of dietary supplements added to fish oil; (10) providing a system and method for reducing the mess and difficulty of dispensing fish oil; (11) providing a fish oil and additional dietary supplement mixture that does not need to be remixed before dispensing; (12) providing a system and method for improving the consumer acceptance of delivering to animals fish oil with or without additional dietary supplements incorporated therein; (13) providing a system and method that helps provide consistent and accurate dosage of dietary supplements to animals; (14) providing a system and method for at least partly encapsulating one or both of fish oil and additional dietary supplements to mask from human beings an otherwise offensive smell of the fish oil; and (15) providing a system and method for reducing oxidization of one or both of fish oil and additional dietary supplements. These and other advantages of various embodiments will be apparent upon reading the following.

BRIEF DESCRIPTION OF THE DRAWINGS

FIGS. 8 and 9 are photographs showing a mixture of fish oil and wax along with a hand-operated pump system for dispensing the mixture, according to one embodiment.

DETAILED DESCRIPTION OF PREFERRED EMBODIMENTS

1. Fish Oil as a Carrier for Added Dietary Supplements

Figure 1:
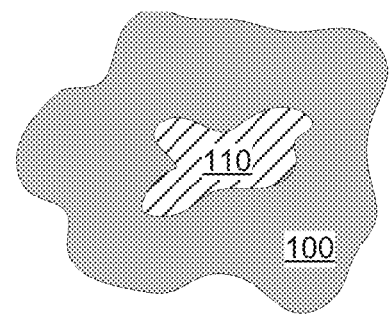
FIG. 1 is a schematic diagram of a dietary supplement added to and encapsulated by fish oil, according to one embodiment.

According to a preferred embodiment, fish oil is used as a carrier liquid to deliver health improving added dietary supplements to an animal. Fish oil is particularly well suited to function as a supplement carrier and delivery medium for several reasons. First, fish oil contains extremely low levels of moisture and water and helps prevent moisture from reaching the added dietary supplement before it is ingested by the animal. Thus, the fish oil helps ensure that the added dietary supplement is not prematurely activated or oxidized by contact with moisture. Next, as schematically illustrated in FIG. 1, fish oil 100 at least partly encapsulates added dietary supplement 110 and thereby masks from the animal one or both of offensive smell and taste of added dietary supplement 110. Thus, the fish oil helps increase the palatability of added dietary supplement 110 to the animal. Further, upon ingestion, the fish oil itself may act as a dietary supplement that enhances intake of omega-3 fatty acids and other essential fatty acids. As should be apparent, FIG. 1 is simply a schematic illustration and should not be construed as illustrating how an actual cross-section of a supplement sample would appear.

The fish oil may be derived from a variety of fish, including, but not limited to, salmon, cod, pollock, hake, mackerel, lake trout, herring, sardine, anchovies, and albacore tuna. The added dietary supplement may comprise a commercially available dietary supplement. One class of dietary supplements includes probiotics, which are live microorganisms that beneficially affect the health of an animal when the probiotics are administered in adequate amounts. For example, probiotics may improve the microbial balance of naturally occurring bacteria in the colon of the animal to improve digestion. Another class of dietary supplements includes prebiotics, which are non-digestible food ingredients that beneficially affect the animal by selectively stimulating one or both of growth and activity of certain naturally occurring bacteria in the colon of the animal to improve digestion. Yet another class of dietary supplements includes digestive enzymes, which are bimolecular catalysts that aid in the digestion of food by helping to breakdown proteins into amino acids, fats into fatty acids, and starches into various sugars by lowering the activation energy needed for the respective chemical reactions.

Still another class of dietary supplements includes joint rebuilding and joint pain reducing dietary supplements, such as glucosamine, chondroitin, and MSM. Glucosamine sulfate and chondroitin sulfate are components of normal cartilage and are the building blocks for proteoglycans and stimulate chondrocytes to make new collagen and proteoglycans. Because glucosamine and chondroitin dietary supplements stimulate the production of new cartilage components, glucosamine sulfate and chondroitin sulfate dietary supplements may be able to help the body repair damaged cartilage. There is evidence that glucosamine and chondroitin can reduce pain from osteoarthritis, usually within several weeks to several months after initiating therapy. MSM has shown benefits for a range of health problems, including arthritis, muscle pain, and joint pain. MSM has shown promise in the inhibition of pain impulses along nerve fibers, achieving analgesia, lessening inflammation, increasing blood supply, reducing muscle spasms, and softening of scar tissue. Other classes of dietary supplements include enzymes, minerals, and vitamins.

According to a preferred embodiment, a probiotic and a digestive enzyme are mixed with fish oil. The probiotic preferably comprises an unactivated bacillus subtilis bacterium that, when ingested by the animal, exhibits probiotic activity. Suitable bacillus subtilis bacterium is available in powdered form from Kemin Industries, Inc. of Des Moines, Iowa, under the product name Subactil™. The digestive enzyme preferably comprises an unactivated alpha-amylase enzyme that, when ingested by the animal, facilitates increased nutrient release. Suitable alpha-amylase enzymes are available in powdered form from Danisco of Copenhagen, Denmark, under the product name Multifect AA 1200P Alpha Amylase. In one example, the dietary supplement mixture comprises about 26% by weight of a probiotic and about 74% by weight of a digestive enzyme.

A method of producing a fish oil and added dietary supplement mixture comprises measuring a prescribed dose of one or more powdered dietary supplement components, which may be soluble (e.g., oil soluble vitamins) or insoluble in fish oil, measuring a prescribed amount of fish oil, and combining the powdered dietary supplement components and fish oil. In one example, the added dietary supplement comprises about 1.5% to about 22% by weight of the encapsulated supplement mixture, and the fish oil comprises about 98.5% to about 78% by weight of the encapsulated supplement mixture. In another example, the added dietary supplement comprises about 13% to about 14% by weight of the encapsulated supplement mixture and the fish oil comprises about 87% to about 86% by weight of the encapsulated supplement mixture. The fish oil and supplement mixture may have a water activity of about 0.462 at ambient temperature.

Table 1 specifies suitable amounts of added dietary supplements (probiotic, enzyme, and prebiotic) and fish oil according to three example digestive health preparations (e.g., high 100×, medium 50×, and low 10×).

TABLE 1

|  | % | mg |
| --- | --- | --- |
| High 100X | | |
| Probiotic | 2.50% | 100 (0.8 oz) |
| Enzyme | 2.50% | 100 (0.8 oz) |
| Prebiotic | 12.50% | 500 (4 oz) |
| Oil | 82.50% | 3300 (26.4 oz) |
| Total | 100% | 4000 (32 oz) |
| Medium 50X | | |
| Probiotic | 1.25% | 50 (0.4 oz) |
| Enzyme | 1.25% | 50 (0.4 oz) |

TABLE 1-continued

|  | % | mg |
|---|---|---|
| Prebiotic | 6.25% | 250 (2 oz) |
| Oil | 91.25% | 3650 (29.2 oz) |
| Total | 100% | 4000 (32 oz) |
| | Low 10X | |
| Probiotic | 0.25% | 10 (0.08 oz) |
| Enzyme | 0.25% | 10 (0.08 oz) |
| Prebiotic | 1.25% | 50 (0.4 oz) |
| Oil | 98.25% | 3930 (31.44 oz) |
| Total | 100% | 4000 (32 oz) |

If more than one type of additional dietary supplement (e.g., a probiotic, prebiotic, and digestive enzyme) is added to the fish oil, the various additional dietary supplements may be individually combined with the fish oil or may be first mixed together and then combined with the fish oil. Optionally, the added dietary supplement(s) and fish oil may be mixed using a mechanical mixer, such as a ribbon blender, V shell mixer, vertical planetary mixer, inline high shear mixer, or any other mixer or method that incorporates all the materials together.

After the additional dietary supplement components and fish oil have been combined, the fish oil and added dietary supplement mixture is then introduced into a container, such as a bottle, squeeze tube, or jar. Preferably, the container is sealed or sealable (e.g., with a cap) so that the container holding the mixture therein may be shaken with little or no leakage to mix or remix the fish oil and added dietary supplement. Any suitable container may be used. After the mixture is introduced into the container, the container may then be passed through a filler line to be capped, sealed, labeled, dated, and boxed for shipment to the customer. By way of another example, additional dietary supplements can be premixed and added to a bottle, squeeze tube, or jar by a calibrated dosing system, such as a 4400tx-115v Rotary Shuttle Powder Filler system available from Kinematics & Controls Corp, to deposit the additional dietary supplements into the container before the fish oil is added.

Before feeding the mixture to the animal, the mixture is shaken, stirred, or otherwise mixed to more evenly distribute the added dietary supplements within the fish oil. For example, if the container is sealed with a cap, one or more added dietary supplements may be redistributed in the fish oil mixture by vigorously shaking the container, thereby allowing a more accurate dose of the added dietary supplements to be delivered to the animal. After agitating, the mixture itself may then be fed to the animal or may be mixed in its food.

The foregoing is further illustrated with regard to the following non-limiting example.

Example 1

The following example is based on a 32 oz (or 907,185 mg) sample preparation. A Porta-Shell® laboratory blender with intensifier bar available from Patterson Industries, LTD of Toronto, Ontario was used to mix about 513 mg of a bacillus subtilis probiotic dietary supplement, Subactil™, and about 1,429 mg of an alpha-amylase digestive enzyme dietary supplement, Multifect AA 1200P Alpha Amylase. The probiotics and digestive enzymes in dry powder form were mixed to form a well-dispersed probiotic and digestive enzyme mixture. The probiotic and digestive enzyme mixture was then introduced into a 4400tx-115v Rotary Shuttle Powder Filler system available from Kinematics & Controls Corporation of Brooksville, Fla. The shuttle dosing machine measured a prescribed amount of the probiotic and digestive enzyme mixture and dropped the prescribed amount (1,942 mg) of the combined mixture into a dosage bottle. A series APD-6 Automatic Positive Displacement Filling Machine available from Accuteck Packaging Equipment of Vista, Calif. was then used to fill the dosage bottle with about 905,242 mg of salmon oil. The salmon oil was prepared by Trident Seafoods of Seattle, Wash. in a commercial fish oil recovery system. The probiotic and digestive enzyme mixture was delivered or dosed into dosage bottles, and the fish oil was added to finish the filling process. The water activity ($a_W$) of the fish oil with or without the additional dietary supplements averaged about 0.25 to 0.375. The water activity ($a_W$) was tested using a Water Activity Meter Series 3 system available from Aqua Lab of Pullman, Wash.

Two iterations of applying pumping force to a pump dispenser delivering about 2 ml for each pump iteration dispersed about 4 ml (0.8815 tsp) of a probiotic, digestive enzyme, and fish oil mixture (two pump iterations delivered about 3,629 mg of total combined mixture and thus delivered 2.05 mg of Subactil™, 5.72 mg of Alpha Amylase, and 3620 mg of salmon oil) onto a flat plate for testing against a control sample to determine whether the probiotic, digestive enzyme, and fish oil mixture was more effective than the control sample for delivering dietary supplements to canines. The probiotic, digestive enzyme, and fish oil mixture was prepared as described in Example 1 and distributed the same day. The control sample comprised a mixture of about 2.05 mg of Subactil™ probiotics and about 5.72 mg of Multifect AA 1200P Alpha Amylase digestive enzymes placed in a dry powdered form on a flat plate of the same type as that used for the probiotic, digestive enzyme, and fish oil mixture. The plate containing the probiotic, digestive enzyme, and fish oil mixture was placed next to the plate containing the probiotic and digestive enzyme mixture in the dry powdered form, and each canine from a set of twenty-four canines was individually allowed to consume one or both of the probiotic, digestive enzyme, and fish oil mixture and the probiotic and digestive enzyme mixture in the dry powdered form. The set of twenty-four canines comprised a random sampling of canines from a local pound and thus included canines of various breeds, ages, sex, and weights.

Twenty-one of the twenty-four canines completely consumed the probiotic, digestive enzyme, and fish oil mixture, while only six of the twenty-four canines completely consumed the probiotic and digestive enzyme mixture in the dry powdered form. The test results are summarized in Table 2.

TABLE 2

|  | Completely Consumed | Not Consumed |
|---|---|---|
| Fish Oil Mixture | 21 | 3 |
| Dry Powdered Mixture | 6 | 18 |

Thus, as can be concluded from the test results, using fish oil as a carrier to deliver added dietary supplements greatly improves the willingness of an animal to consume the added dietary supplements and the ease of which the added dietary supplements can be delivered to the animal.

II. Thickening Fish Oil

Fish oil, with or without additional dietary supplements suspended therein, confers many health benefits upon animals due to the nutrients naturally present in fish oil. For example, fish oil contains relatively high amounts of nutrients, such as omega-3 fatty acids and other essential fatty acids, that are normally not produced by the animal and instead must be ingested by the animal as part of a healthy diet. In other words, fish oil itself is a dietary supplement. In addition, fish oil is particularly well suited to function as a carrier for additional dietary supplements added to the fish oil and greatly improves the willingness of an animal to consume the added dietary supplements as discussed above.

Figure 2:
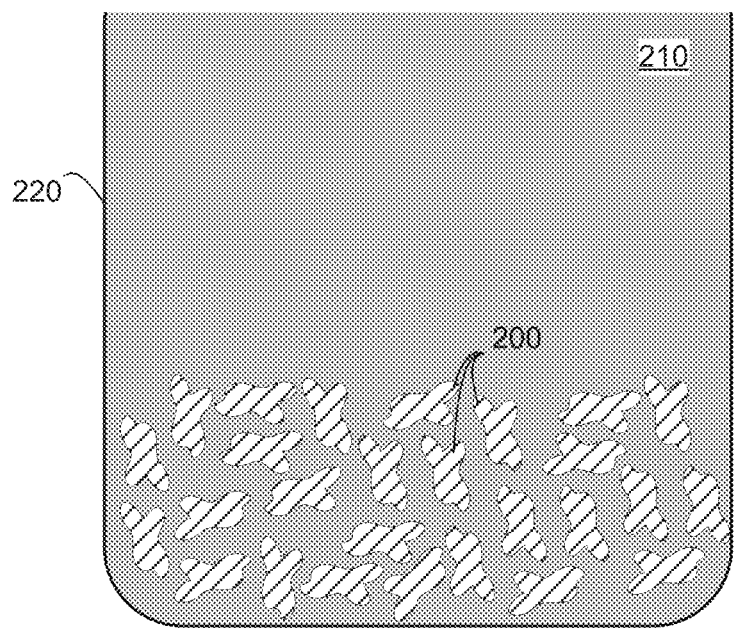
FIG. 2 is a schematic diagram of a container holding a mixture of fish oil and one or more additional dietary supplements that have settled to the bottom of the container over time, according to one embodiment.

Although fish oil confers health benefits to animals, consumer acceptance of fish oil products may be adversely impacted by the offensive smell of fish oil to certain human beings. In addition, fish oil generally has a very low viscosity at ambient temperature, such as about 30-60 centipoise (cP), and tends to be messy to dispense by pumping, pouring, and squeezing due to the thin and runny nature of the fish oil. Further, as schematically illustrated in FIG. 2, added dietary supplements 200, such as glucosamine, chondroitin, MSM, probiotics, prebiotics, enzymes, digestive enzymes, minerals, vitamins, or any combination thereof, that are suspended in a fish oil carrier 210 may settle to the bottom of container 220 over time (e.g., a fish oil and added dietary supplement mixture generally has a very low viscosity, such as about 53 cP). Thus, the added dietary supplements may need to be dispersed in or otherwise reintroduced into the mixture by vigorous shaking or mixing before delivering the mixture to the animal. This process may add to reduced consumer acceptance and potential inaccurate dosing of the added dietary supplements (e.g., different portions of the fish oil may have different concentrations of added dietary supplements).

Thus, according to a preferred embodiment, a carrier liquid, including fish oil with or without additional dietary supplements mixed therein, is thickened with a thickening agent, such as silica, wax, or a combination of both to create a viscous liquid blend. The thickening agent imparts to the carrier liquid a viscosity that is greater than a carrier liquid viscosity (e.g., a fish oil viscosity) at ambient temperature. According to one embodiment, the thickening agent is inert to animals and chemically inert to fish oil and any added dietary supplements so that the naturally present nutrients of the fish oil and the added dietary supplements are not substantially degraded when the thickening agent is dispersed in the carrier liquid. In one example, the thickening agent includes an amorphous finely divided silica such as a precipitated silica, a fumed silica, or a combination of both. Moreover, the silica may be hydrophilic. Suitable types of precipitated silica include Sipernat® 22LS available from Evonik Industries of Hanau-Wolfgang, Germany. Suitable types of fumed silica include Aerosil® 200 Pharma available from Evonik. Other brands and types of precipitated and fumed silica may be used as the thickening agent.

According to another example, the thickening agent includes a natural or synthetic wax. Suitable natural waxes that are inert to animals include animal waxes, such as beeswax, and vegetable waxes, such as soy wax. One type of suitable natural wax is the Calsoy brand soy wax available from Calwax, LLC of Irwindale, Calif. Suitable synthetic waxes include petroleum waxes, such as paraffin wax. Using wax as a thickening agent may also create a more aesthetically pleasing and polished product. For example, thickened fish oil without wax may have a relatively dark brown color. In contrast, when wax is used alone as the thickening agent or in combination with another thickening agent, the thickened fish oil has a relatively light color and a sheen to it. Moreover, wax may inhibit separation of the fish oil and thickening agent. As previously described, the fish oil may be derived from a variety of fish, including, but not limited to, salmon, cod, pollock, hake, mackerel, lake trout, herring, sardine, anchovies, and albacore tuna.

Figure 3:
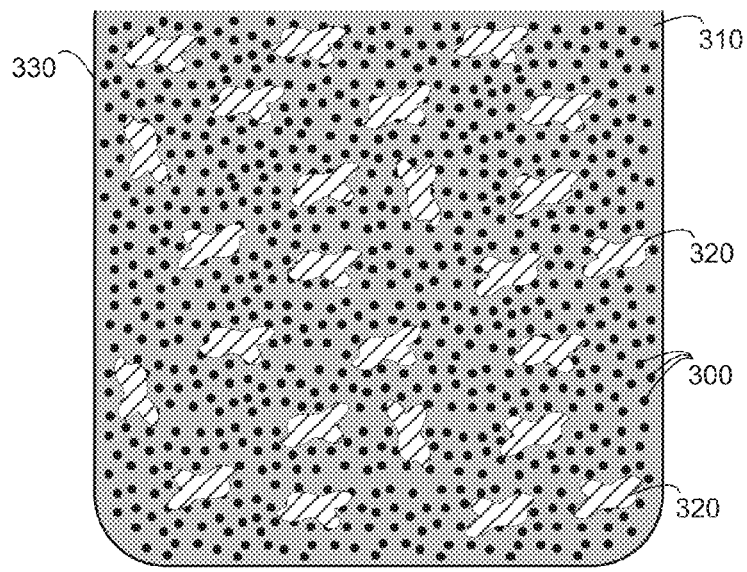
FIG. 3 is a schematic diagram of a container holding a mixture of fish oil, one or more added dietary supplements, and a thickening agent that helps keep the added dietary supplements suspended in the mixture, according to one embodiment.

Adding a thickening agent, such as silica or wax, to fish oil increases its viscosity. The higher viscosity helps reduce dripping and running and results in a much cleaner product, less mess, and better consumer acceptance in the marketplace. In addition, as schematically illustrated in FIG. 3, adding a thickening agent 300 to fish oil 310 helps keep one or more added dietary supplements 320 suspended in fish oil 310 for a longer period of time and helps prevent added dietary supplements 320 from settling to the bottom of a container 330 holding the liquid blend. Thus, adding a thickening agent to fish oil helps improve control and accuracy when delivering added dietary supplements to an animal, the dispensability of the fish oil, the suspendability of added dietary supplements in the fish oil, and the deliverability of fish oil and added dietary supplements to animals.

Figure 4:
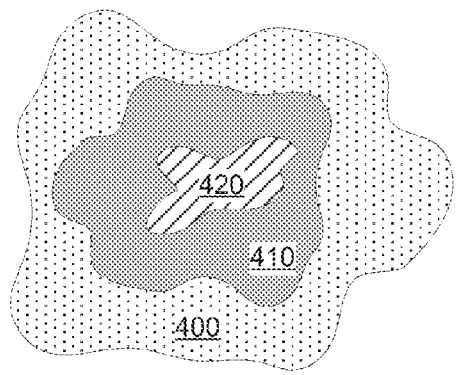
FIG. 4 is a schematic diagram of a dietary supplement added to and encapsulated by fish oil that has been encapsulated by wax, according to one embodiment.
Figure 5:
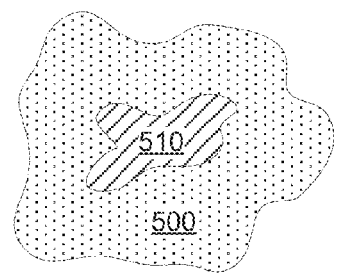
FIG. 5 is a schematic diagram of a dietary supplement encapsulated by wax, according to one embodiment.

Moreover, adding certain thickening agents, such as waxes, to fish oil may help to reduce oxidation of the fish oil (thereby increasing freshness of the fish oil) and the offensive fish odor to human beings and thereby helps increase consumer acceptance. For example, as schematically illustrated in FIG. 4, wax 400 may combine with and at least partly encapsulate fish oil 410, which is itself at least partly encapsulating added dietary supplement 420. By way of another example, as schematically illustrated in FIG. 5, wax 500 may directly combine with and at least partly encapsulate added dietary supplement 510.

Various amounts of the thickening agent can be added to the fish oil to obtain a desired viscosity for the liquid blend. In one example, the liquid blend includes a relatively small amount of the thickening agent to achieve a viscosity similar to that of a thin liquid dish soap. In contrast, the liquid blend may include a relatively large amount of the thickening agent to achieve a viscosity similar to that of a thick grease. Other viscosities may be desired for the liquid blend such as those corresponding to body lotions, hand creams, and gels. Preferably, the viscosity is selected to enable the liquid blend to be dispensed (e.g., pumped, squeezed) from a container using a fluid-displacement dispenser (described below) without the liquid blend causing a mess due to undesired dripping of the liquid blend from the container. Preferably, the viscosity of the liquid blend allows it to be dispensed without substantially clogging the fluid-displacement dispenser. In one example, the viscosity of the liquid blend at ambient temperature (e.g., 19-25° C.) ranges from about 90-250,000 cP. In another example, the viscosity of the liquid blend at ambient temperature ranges from about 100,000-250,000 cP. In another example, the viscosity of the liquid blend at ambient temperature ranges from about 150,000-210,000 cP. Specifically, the liquid blend may include an amount of thickening agent in a range from about 0.5-30% by weight of the liquid blend, preferably from about 5-25% by weight.

Moreover, the thickening agent may be of a single type or may include a combination of two or more different thickening agents. In one example, silica alone is used as the thickening agent, and the amount of silica used to thicken the fish oil is in a range from about 0.5-20% by weight, preferably from about 5-15% by weight. Additionally, the thickening agent may include a single type of silica, such as a precipitated silica, or a combination of different types of silica, such as a combination of precipitated silica and fumed silica. In one example, the liquid blend includes a combination of precipitated silica and fumed silica, in which an amount of the precipitated silica is in a range from about 0.1-20% by weight, preferably from about 5-15% by weight, and an amount of the fumed silica is in a range from about 0.1-20% by weight, preferably from about 0.2-5% by weight. In another example, the liquid blend includes fish oil, silica, and an added dietary supplement in which the silica comprises about 17% by weight, the added dietary supplement comprises about 14% by weight, and the fish oil comprises about 69% by weight.

In another example, wax alone is used as the thickening agent, and the amount of wax used to thicken the fish oil is in a range from about 0.1-30% by weight, preferably from about 5-25% by weight. In another example, the liquid blend includes fish oil, wax, and an added dietary supplement in which the wax comprises about 25% by weight, the added dietary supplement comprises about 14% by weight, and the fish oil comprises about 61% by weight. In another example, a combination of silica and wax is used to thicken the fish oil, in which an amount of the silica (precipitated, fumed, or a combination of both) is in a range from about 0.5-20% by weight, preferably from about 5-15% by weight, and an amount of the wax is in a range from about 0.1-15% by weight, preferably from about 0.1-5% by weight. In another example, a combination of precipitated silica, fumed silica, and wax is used to thicken the fish oil in which an amount of the precipitated silica is in a range from about 0.1-15% by weight; preferably from about 5-15% by weight, an amount of fumed silica is in a range from about 0.1-15% by weight, preferably from about 0.1-5% by weight, and an amount of the wax is in a range from about 0.1-15%, preferably from about 0.1-5%.

a. Thickening Fish Oil with Silica

Various methods can be used to disperse silica into fish oil to create a viscous liquid blend. A method of thickening fish oil according to one embodiment comprises mechanically stirring fish oil at any temperature and adding one or both of precipitated silica and fumed silica in a powdered form to the fish oil while continuing to stir the fish oil until a desired viscosity is achieved.

A method of thickening fish oil according to another embodiment comprises mechanically stirring fish oil at any temperature and adding one or both of precipitated silica and fumed silica in a powdered form to the fish oil while continuing to stir the fish oil until a desired viscosity is achieved. The fish oil and silica mixture is then cycled through a high energy mechanical mixer, such as a Quick Stick Immersion Blender WSB40 available from Waring Commercial at any cooking supply house, until the desired viscosity is achieved. Optionally, vacuum pressure may be applied to the mixer while the fish oil and silica mixture is cycling through the mixer to minimize oxygen exposure.

A method of thickening fish oil according to still another embodiment comprises cycling fish oil through a high shear in-line mixer, such as a model 150L high shear in-line mixer available from Silverson Machines, Inc. of East Longmeadow, Mass., while silica is added (in a powdered form) into the in-line mixer until a desired viscosity is achieved. The silica may be introduced into a homogenizer or a line mixer using any suitable technique, such as by drawing the silica into the mixer using vacuum pressure by pumping the silica into the mixer, injecting the silica into the mixer, or by premixing the fish oil and the silica and using an in-line high shear mixer or homogenizer to mix and combine all of the components to a desired viscosity. Optionally, vacuum pressure may be applied to the homogenizer while the fish oil and silica mixture is cycling through the homogenizer to minimize oxygen exposure.

Various amounts of silica can be used to thicken fish oil to a desired viscosity. Several examples of liquid blends in which silica is used as the thickening agent are presented below. In one example, about 0.5% by weight of precipitated silica is mixed with fish oil to yield a viscosity of about 90 cP at about 19° C. In another example, about 2% by weight of precipitated silica is mixed with fish oil to yield a viscosity of about 1620 cP at about 19° C. In another example, about 2% by weight of precipitated silica, about 6.25% by weight of glucosamine, about 2.5% by weight of chondroitin, and about 5% of MSM are mixed with fish oil to yield a viscosity of about 1540 cP at about 19° C. In another example, about 2% by weight of precipitated silica, about 6.25% by weight of inulin, about 1.25% by weight of Subactil™, and about 1.25% of enzyme are mixed with fish oil to yield a viscosity of about 460 cP at about 19° C. In another example, about 5% by weight of precipitated silica is mixed with fish oil by hand using a whisk to yield a viscosity of about 3,740 cP at about 19° C. In another example, about 5% by weight of precipitated silica is mixed with fish oil using a relatively low energy mechanical mixer to yield a viscosity of about 4,860 cP at about 19° C. In another example, about 5% by weight of precipitated silica is mixed with fish oil using a high energy immersion blender to yield a viscosity of about 9,760 cP at about 19° C.

In another example, 72,575 mg of precipitated silica (e.g., 8% by weight) is mixed into 834,610 mg of fish oil (e.g., 92% by weight) to yield a viscosity of about 114,000 cP at about 19° C. In another embodiment, about 9% by weight of precipitated silica and about 0.5% by weight of fumed silica are mixed with fish oil to yield a viscosity of about 204,000 cP at about 19° C. In another example, about 10% by weight of precipitated silica and about 1% by weight of fumed silica are mixed with fish oil to yield a viscosity of about 208,000 cP at about 19° C. In another example, about 12% by weight of precipitated silica and about 1% by weight of fumed silica are mixed with fish oil to yield a viscosity similar to that of a stiff grease.

The methods of thickening fish oil described above combine fish oil and silica such that the silica absorbs the fish oil and thereby increases its viscosity to help reduce dripping and running, allow added dietary supplements, if any, to be suspended in the fish oil for a longer period of time, and enhance dispensing and delivery of the fish oil with or without additional dietary supplements suspended therein to animals. The viscosity of the fish oil can be increased to resemble that of various viscous liquids such as syrup, hand lotion, tomato ketchup, pudding, or toothpaste.

b. Thickening Fish Oil with Wax

Various methods can be used to disperse wax into fish oil to create a viscous liquid blend. A method of thickening fish oil with wax according to one embodiment comprises heating fish oil to a temperature in a range from about 50-70° C. and mechanically stirring the heated fish oil as wax is added in a solid form. The wax combines with the fish oil as the wax melts in the heated fish oil. After the wax has combined with the fish oil, the wax and fish oil mixture is allowed to cool to an ambient temperature. The mixture may be allowed to cool to the ambient temperature naturally over time, or the mixture may be deliberately cooled, such as by placing the mixture in a refrigerated environment or by using a heat exchanger.

A method of thickening fish oil with wax according to another embodiment comprises heating and mechanically stirring fish oil to a temperature in a range from about 50-70° C. in a first container and heating and mechanically stirring wax to a temperature in a range from about 50-70° C. in a second container to melt the wax. The heated wax and heated fish oil are then combined and mechanically mixed. After the wax has been combined with the fish oil, the wax and fish oil mixture is allowed to cool to ambient temperature. As previously described, the mixture may be allowed to cool to ambient temperature naturally over time, or the mixture may be deliberately cooled, such as by placing the mixture in a refrigerated environment or by using a heat exchanger.

A method of thickening fish oil with wax according to still another embodiment comprises heating wax to a temperature in a range from about 50-70° C. to melt the wax and mechanically stirring the heated wax as fish oil is added in a liquid form. After the fish oil has been combined with the wax, the wax and fish oil mixture is allowed to cool to ambient temperature. As previously described, the mixture may be allowed to cool to ambient temperature naturally over time, or the mixture may be deliberately cooled, such as by placing the mixture in a refrigerated environment or by using a heat exchanger.

A method of thickening fish oil with wax according to still another embodiment comprises using wax and fish oil that have been combined and cooled as described in one of the methods above and mechanically inducing high shear mixing of the wax and fish oil with or without dietary additives to achieve a creamy well mixed liquid form. After the mixture has been high shear mixed, the resulting friction from high shear mixing heats the mixture above ambient temperature. The mixture is allowed to cool to ambient temperature. As previously described, the mixture may be allowed to cool to ambient temperature naturally over time, or the mixture may be deliberately cooled, such as by placing the mixture in a refrigerated environment or by using a heat exchanger.

A method of thickening fish oil with wax according to still a further embodiment comprises using wax and fish oil at ambient temperature and mechanically stirring the wax and fish oil in a high shear in-line mixer to achieve a liquid form. After the fish oil has been combined with the wax, the resulting friction from high shear mixing heats the oil and wax mixture. The wax and fish oil mixture is allowed to cool to ambient temperature. As previously described, the mixture may be allowed to cool to ambient temperature naturally over time, or the mixture may be deliberately cooled, such as by placing the mixture in a refrigerated environment or by using a heat exchanger.

Various amounts of wax can be used to thicken fish oil to a desired viscosity and to brighten the fish oil to a desired color. Several examples of liquid blends in which wax is used as the thickening agent are presented below. In one example, about 25% by weight of wax is mixed with fish oil to yield a viscosity of about 12,300 cP at about 21° C. In another example, about 1% by weight of wax, about 9% by weight of precipitated silica, and about 0.5% by weight of fumed silica are mixed with fish oil to yield a viscosity of about 160,000 cP at about 19° C. In another example, about 1% by weight of wax, about 10% by weight of precipitated silica, and about 1% by weight of fumed silica are mixed with fish oil to yield a viscosity of about 190,000 cP at about 19° C. In another example, about 1% by weight of wax, about 12% by weight of precipitated silica, and about 1% by weight of fumed silica are mixed with fish oil to yield a viscosity similar to that of a stiff grease.

The methods of thickening fish oil described above combine wax (or wax and silica) with fish oil such that the viscosity of the mixture increases as the mixture cools to ambient temperature. The liquid blend of fish oil and wax may help to reduce the strong fishy odor of the fish oil human beings find offensive and oxidation (when the wax combines with and surrounds the fish oil), helps reduce dripping and running, allows added dietary supplements, if any, to be suspended in the fish oil for a longer period of time, and enhances dispensing and delivery of the fish oil with or without additional dietary supplements suspended therein to animals. The wax also lightens the color of the liquid blend and may inhibit the fish oil and thickening agent from separating over time. The viscosity of the fish oil can be increased to resemble that of various viscous liquids such as syrup, hand lotion, tomato ketchup, pudding, or toothpaste.

According to a preferred embodiment, the viscosity of the thickened fish oil is selected so that added dietary supplements can be suspended in the thickened fish oil without settling to a bottom of a container for about 180 days. In comparison, added dietary supplements suspended in unthickened fish oil will typically settle out completely in twenty-four hours.

The thickened fish oil mixture may be dispensed using any suitable delivery system. For example, FIGS. 6-9 depict a delivery system 600 comprising a container 610 for holding thickened fish oil 620 (silica-thickened salmon fish oil in FIGS. 6 and 7) or 820 (wax-thickened salmon fish oil in FIGS. 8 and 9), which may have one or more added dietary supplements suspended therein, and a fluid-displacement dispenser 630 coupled to container 610 for dispensing thickened fish oil 620 or 820 after the application of a pumping force to fluid-displacement dispenser 630. Container 610 may comprise any suitable material, such as plastic or glass. Fluid-displacement dispenser 630 may comprise a fluid inlet 631 disposed within container 610 and configured to draw thickened fish oil 620 or 820 into fluid-displacement dispenser 630, a fluid outlet 640 disposed outside of container 610 and configured to dispense thickened fish oil 620 or 820, and an axially displaceable pump 650 configured to transport a portion of thickened fish oil 620 or 820 from within container 610 via the fluid inlet to a position outside of container 610 via fluid outlet 640 after a pumping force F is applied to axially displaceable pump 650. Because delivery system 600 contains thickened fish oil 620 or 820, an added dietary supplement will remain suspended in thickened fish oil 620 or 820 and there is no need to shake container 610 or otherwise remix the fish oil and added dietary supplement mixture before dispensing the same. Thus, delivery system 600 and thickened fish oil 620 or 820 help dispense more accurate doses of added dietary supplements (e.g., by fully depressing axially displaceable pump 650 a certain number of times).

By way of another example, a delivery system comprises a container having at least one flexible sidewall and a fluid-displacement dispenser coupled to the container for dispensing thickened fish oil and possibly one or more added dietary supplements. The fluid-displacement dispenser comprises the flexible sidewall of the container and a nozzle in fluid communication with the container, and is configured to dispense a portion of the thickened fish oil from the container in response to a squeezing force radially applied to the flexible sidewall. The flexible side may comprise the vertical section of the container or any portion thereof. For example, the container could be made of flexible material so that the container can be squeezed to dispense the thickened fish oil and added dietary supplements, if any. By way of another example, the container may include a flexible portion that dispenses the thickened fish oil after being depressed.

The liquid blend of fish oil and the thickening agent may be dispensed on an edible item, such as an animal's food (e.g., kibble) or a dog treat, so that the animal ingests an appreciable amount of the liquid blend when the animal eats the edible item. The liquid blend may serve as a palate enhancer to entice the animal to eat the edible item. Because the liquid blend is thickened, it forms a viscous dietary covering that stays on the edible item instead of running off the edible item and to the bottom of the animal's food container. For example, the liquid blend may function as a dietary gravy or sauce for kibble. Alternatively, the liquid blend may be given to an animal without dispensing the liquid blend on an edible item.

As should be apparent from the description above, thickening fish oil helps reduce mess and leaking of fish oil due to shaking the container before each delivery, helps minimize undesirable dripping and running of fish oil, helps keep added dietary supplements suspended in the fish oil, helps to control the amount of liquid blend given to an animal, helps deliver a more accurate dose of added dietary supplements, helps reduce the offensive fish odor to human beings, helps reduce oxidation and increase freshness of the fish oil, and allows a wider variety of dispensing devices to be used that are more convenient for customer use, all of which helps increase customer acceptance of the thickened fish oil.

Specific examples of various liquid blend preparations are presented below. Table 3 specifies suitable amounts (by percentage) of silica, various added dietary supplements, and fish oil according to examples of various silica-thickened oil, joint health (JH), and digestive health (DH) preparations.

TABLE 3

|   | 2% | 4% | 8% | JH-2 | JH-4 | JH-8 | DH-2 | DH-4 | DH-8 |
|---|---|---|---|---|---|---|---|---|---|
| Sipernat ® 22LS | 2.00 | 4.00 | 8.00 | 2.00 | 4.00 | 8.00 | 2.00 | 4.00 | 8.00 |
| Inulin |   |   |   |   |   |   | 6.25 | 6.25 | 6.25 |
| Subactil ™ |   |   |   |   |   |   | 1.25 | 1.25 | 1.25 |
| Enzyme |   |   |   |   |   |   | 1.25 | 1.25 | 1.25 |
| Glucosamine |   |   |   | 6.25 | 6.25 | 6.25 |   |   |   |
| Chondroitin |   |   |   | 2.50 | 2.50 | 2.50 |   |   |   |
| MSM |   |   |   | 5.00 | 5.00 | 5.00 |   |   |   |
| Total | 2.00 | 4.00 | 8.00 | 15.75 | 17.75 | 21.75 | 10.75 | 12.75 | 16.75 |
| Salmon Oil | 98.00 | 96.00 | 92.00 | 84.25 | 82.25 | 78.25 | 89.25 | 87.25 | 83.25 |

The foregoing shall be further illustrated with regard to the following non-limiting examples. Examples 2-5 are based on a 32 oz (or 907,185 mg) sample preparation.

Example 2

A blender was used to mix about 834,610 mg of salmon fish oil and about 72,575 mg of a silica thickening agent, Sipernat® 22LS. The salmon oil was prepared by Trident Seafoods in a commercial fish oil recovery system. The silica thickening agent was in a dry powdered form. The fish oil and silica thickening agent were blended for about 5 minutes at a high-speed setting of the blender to yield thickened fish oil having a viscosity of similar to that of liquid hand soap (e.g., about 114,000 cP at about 19° C.). The viscosity was measured using a Brookfield viscometer model RV-1 DV-I Prime, with a #03 spindle at 5 rpm. The measured percentage torque on the viscometer was 51.6%.

The resulting thickened fish oil was placed in delivery system (e.g., delivery system 600 of FIGS. 6 and 7) and dispensed onto a flat plate. The thickened fish oil was not runny and did not drip from the fluid outlet after being dispensed.

Figures 6, 7:
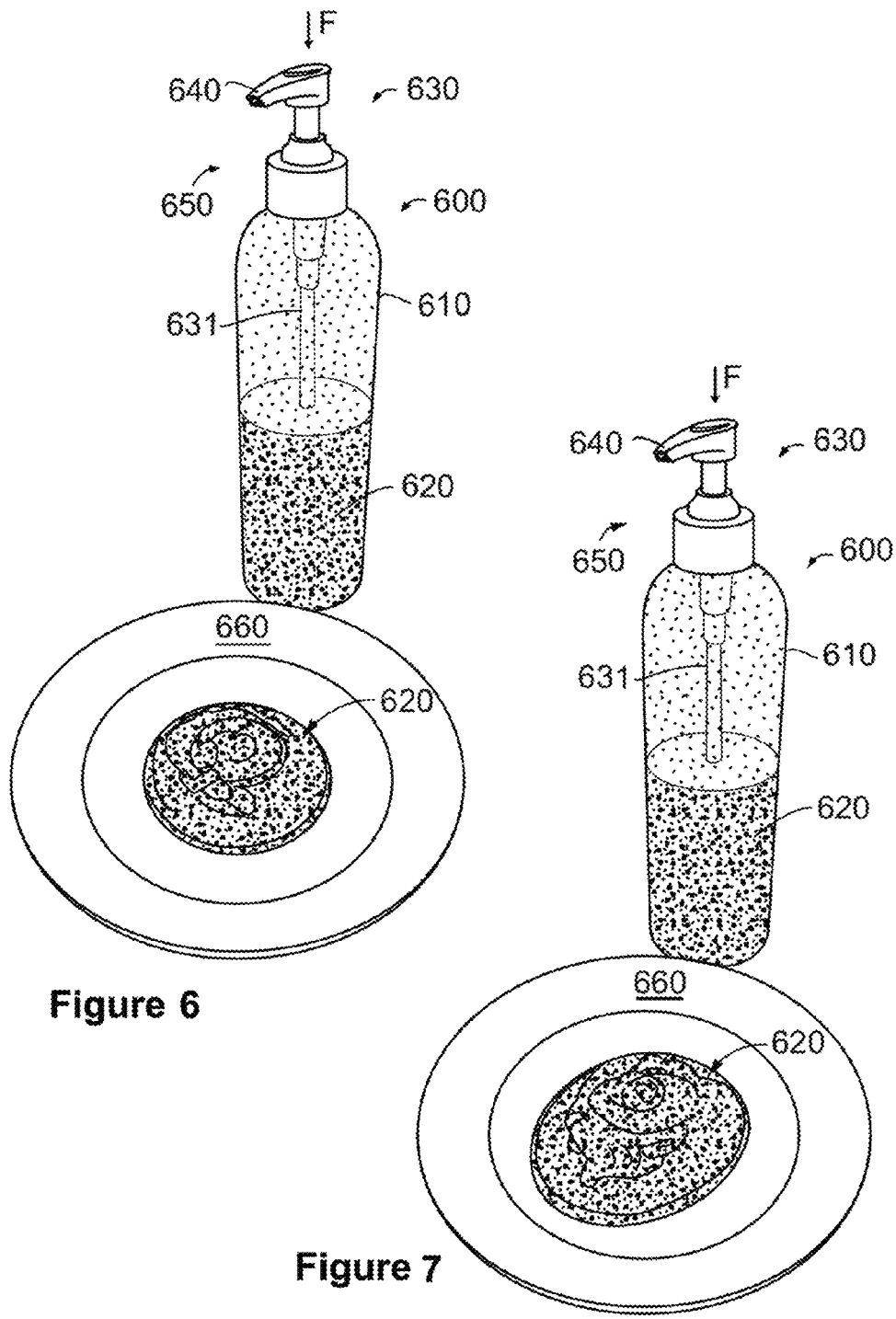
FIGS. 6 and 7 are photographs showing a mixture of fish oil and silica along with a hand-operated pump system for dispensing the mixture, according to one embodiment.

Two iterations of applying pumping force to a pump dispenser delivering about 2 ml for each pump iteration dispersed about 4 ml (0.8815 tsp) of the silica-thickened salmon fish oil onto a flat plate, as shown in FIGS. 6 and 7, for testing to determine whether a group of twenty canines would consume the silica-thickened fish oil mixture. The silica-thickened salmon fish oil mixture was prepared as described in Example 2 and used the same day. The group of twenty canines comprised a random sampling of canines from a local pound and thus included canines of various breeds, ages, sex, and weights. All twenty canines completely consumed the silica-thickened fish oil mixture.

Example 3

A Waring Blender was used to mix about 625,958 mg of salmon fish oil, about 156,489 mg of a silica thickening agent, Sipernat® 22LS, about 56,699 mg of glucosamine, about 11,340 mg of chondroitin, and about 56,699 mg of MSM. The salmon fish oil was prepared from salmon as described in Example 2. The silica thickening agent and the added dietary supplements were in a dry powdered form. The fish oil, silica thickening agent, and added dietary supplements were blended for about 2 minutes at the high speed setting of the blender to yield a homogeneous thickened fish oil with the added dietary supplements suspended therein and having a consistency similar to that of a thick grease. The mixture was too thick to test using a Brookfield viscometer model RV-1 DV-I Prime.

Example 4

A laboratory stove was used to heat about 680,389 mg of salmon fish oil to a temperature of about 50° C. The salmon fish oil was prepared from salmon as described in Example 2. About 226,796 mg of a soy wax thickening agent (from Calwax, LLC) was added to the heated fish oil to melt the wax so that the melted wax combined with the fish oil as the mixture was stirred. After the wax was combined with the fish oil, the wax and fish oil mixture was allowed to cool to a temperature of about 21° C. in a refrigerator. The cooled fish oil and wax mixture had a viscosity of about 12,300 cP. The viscosity was measured using a Brookfield viscometer model RV-1 DV-I Prime, with a #03 spindle operating at 5 rpm. The measured percentage torque of the viscometer was about 58%. There was no apparent settling after the mixture remained at rest for about 120 hours. If settling occurs after about 120 hours, the viscosity may be increased (e.g., by adding more thickening agent) to inhibit settling. The resulting thickened fish oil was placed in a delivery system (e.g., delivery system 600 shown in FIGS. 8 and 9) and dispensed onto a flat plate. The thickened fish oil had a creamy texture, was not runny, and did not drip from a fluid outlet of the delivery system after being dispensed.

Two iterations of applying pumping force to a pump dispenser delivering about 2 ml forced pump iteration dispensed about 4 ml (0.8815 tsp) of a soy wax-thickened salmon fish oil mixture onto a flat plate, as shown in FIGS. 8 and 9, for testing to determine whether a group of twenty canines would consume the soy wax-thickened fish oil mixture. The soy wax-thickened salmon fish oil mixture was prepared a few hours beforehand as described in Example 4. The group of twenty canines comprised a random sampling of canines from a local pound and thus included canines of various breeds, ages, sex, and weights. All twenty canines completely consumed the soy wax thickened fish oil mixture.

Example 5

A laboratory stove was used to heat about 680,389 mg of salmon fish oil to a temperature of about 50° C. in a first container and heat about 226,796 mg of a soy wax thickening agent (from Calwax, LLC) to a temperature of about 50° C. in a second container to melt the wax. The salmon fish oil was prepared from salmon as described in Example 2. The heated fish oil and heated wax were then combined and mechanically mixed. After the wax and fish oil were combined, the wax and fish oil mixture was allowed to cool to a temperature of about 21° C. in a refrigerator. The cooled fish oil and wax mixture had a viscosity of about 6,700 cP. The viscosity was measured using a Brookfield viscometer model RV-1 DV-I Prime, with a #03 spindle operating at 5 rpm. The measured percentage torque of the viscometer was about 30%. The water activity ($a_W$) of the wax and fish oil mixture was about 0.528 at a temperature of about 21.9° C. The water activity ($a_W$) was tested using a Aqualab series 3TE system available from Decagon Devices, Inc. of Pullman, Wash. There was no apparent settling after the mixture remained at rest for about 120 hours. The resulting thickened fish oil had a creamy texture, was not runny, and did not drip from a fluid outlet of the delivery system after being dispensed.

In Examples 6-11 below, the corresponding materials were mixed using a model k45SS mixer available from KitchenAid® of Saint Joseph, Mich. The materials were mixed for about 2.5 minutes using a number 2 speed setting and a wire whisk attachment, the sides of the mixing bowl were scraped, then the materials were mixed again for about 2.5 minutes using the number 2 speed setting.

Example 6

About 12% by weight of Sipernat® 22LS (precipitated silica), about 1% by weight of Aerosil® 200 (fumed silica), and about 1% by weight of heated (about 54-60° C.) Calsoy brand soy wax were mixed with salmon oil. The mixture cooled to ambient temperature (e.g., about 19° C.) and had a viscosity similar to that of a stiff grease. The mixture was too thick to test using a Brookfield viscometer model RV-1 DV-I Prime.

Example 7

About 10% by weight of Sipernat® 22LS (precipitated silica), about 1% by weight of Aerosil® 200 (fumed silica), and about 1% by weight of heated (about 54-60° C.) Calsoy brand soy wax were mixed with salmon oil. The mixture cooled to about 19° C. and had a viscosity of about 190,000 cP. The viscosity was measured using a Brookfield viscometer model RV-1 DV-I Prime, with a #06 spindle operating at 2.5 rpm for 2 minutes. The measured percentage torque on the viscometer was about 49.1%. The mixture had the consistency of a thick pumpable lotion.

Example 8

About 9% by weight of Sipernat® 22LS (precipitated silica), about 0.5% by weight of Aerosil® 200 (fumed silica), and about 1% by weight of heated (about 54-60° C.) Calsoy brand soy wax were mixed with salmon oil. The mixture cooled to about 19° C.) and had a viscosity of about 160,000 cP. The viscosity was measured using a Brookfield viscometer model RV-1 DV-I Prime, with a #06 spindle operating at 2.5 rpm for 2 minutes. The measured percentage torque on the viscometer was about 42.2%. The mixture had the consistency of a moderately thick pumpable lotion.

Example 9

About 12% by weight of Sipernat® 22LS (precipitated silica) and about 1% by weight of Aerosil® 200 (fumed silica) were mixed with salmon oil. At about 19° C., the mixture had a viscosity similar to that of a stiff grease. The mixture was too thick to test using a Brookfield viscometer model RV-1 DV-I Prime.

Example 10

About 10% by weight of Sipernat® 22LS (precipitated silica) and about 1% by weight of Aerosil® 200 (fumed silica) were mixed with salmon oil. At about 19° C., the mixture had a viscosity of about 208,000 cP. The viscosity was measured using a Brookfield viscometer model RV-1 DV-I Prime, with a #06 spindle operating at 2.5 rpm for 2 minutes. The measured percentage torque on the viscometer was about 50.9%. The mixture had the consistency of a thick pumpable lotion.

Example 11

About 9% by weight of Sipernat® 22LS (precipitated silica) and about 0.5% by weight of Aerosil® 200 (fumed silica) were mixed with salmon oil. At about 19° C., the mixture had a viscosity of about 204,000 cP. The viscosity was measured using a Brookfield viscometer model RV-1 DV-I Prime, with a #06 spindle operating at 2.5 rpm for 2 minutes. The measured percentage torque on the viscometer was about 53%. The mixture had the consistency of a thick pumpable lotion.

While embodiments disclosed herein have been discussed with reference to animals, such as canines, the embodiments disclosed herein are equally applicable to promoting the health or wellness (e.g., by delivering health improving dietary supplements, such as glucosamine, chondroitin, MSM, probiotics, prebiotics, enzymes, digestive enzymes, minerals, vitamins, medications, or other dietary supplements) for a variety of animals, including but not limited to non-human primates, other companion animals (e.g., felines, horses, small mammals, reptiles), food animals, laboratory animals, birds, and wild animals.

III. Flavored/Scented Fish Oil

Because fish oil contains nutrients such as omega 3 fatty acids (e.g., EPA and DHA), companion animals consuming fish oil can derive a number of health benefits. However, different companion animals such as dogs, cats, horses, small mammals, birds, and reptiles respond to tastes and smells when choosing food to consume and may be deterred from consuming fish oil due to its inherent fishy scent and flavor. Moreover, because of the offensive odor of fish oil, pet owners may be reluctant to purchase fish oil for their pets regardless of its health benefits.

Conventional systems and methods to deodorize fish oil are relatively complex and time consuming. Conventional systems typically alter fish oil from its natural state to rid fish oil of its scent. For example, the fish oil is filtered and heated, and in some cases chemicals and solvents are used to remove the odor from fish oil.

Disclosed herein is a process for combining an additive to fish oil to enhance an animal's willingness to consume and ingest it. The additive may be a flavoring, a scent, or, preferably, a combination of both and is referred to herein as a scented flavoring. The scented flavoring changes either one or both of the taste and scent of the fish oil so that an animal will be likely to consume the fish oil more readily, perhaps on a day-to-day feeding program. In one example, the scented flavoring is added so that an omnivorous grazing animal such as a horse will not be deterred from consuming the fish oil due to its taste and scent but will regularly consume the fish oil and reap its health benefits. By masking the odor of fish oil with the scented flavoring, pet owners will experience a pleasant scent instead of a fishy one when giving their pets fish oil. Moreover, unlike conventional deodorization methods and systems in which fish oil is altered, the disclosed process leaves the fish oil in a natural and an unadulterated state. The fish oil may be flavored and scented with or without either one or both of added dietary supplements and thickening agents as described above.

Examples of scented flavorings that may be used include either or both of berry-based flavorings and scents such as cranberry, blueberry, blackberry, boysenberry, raspberry, and strawberry; either or both of fruit flavorings and scents such as cherry, pear, plum, prune, apple, apricot, peach, banana, and orange; either or both of plant-based flavorings and scents such as mint, peppermint, spearmint, maple, and anise; and either or both of meat-based flavorings and scents such as beef, chicken, liver, and pork. In one example, a flavoring agent available from BFI Innovations, Inc. of Elgin, Ill. is used. Table 4 below includes examples of suitable types and amounts of scented flavorings available from BFI Innovations, Inc. that may be mixed with about 907 kilograms (kgs) (about 2,000 pounds) of fish oil to make the fish oil more palatable for animals.

TABLE 4

| Scented Flavoring | Amount |
|---|---|
| Liquid Grilled Chicken Flavor, Product No. 03352 | about 0.53-1.81 kgs |
| Liquid Berry Flavor OM, Product No. 02042 | about 0.23-0.91 kg |
| Liquid Natural Peppermint Flavor, Product No. 16136 | about 0.53-1.81 kgs |
| Liquid Banana-ADE OM Flavor, Product No. 002034 | about 0.53-1.81 kgs |
| Liquid Cherry-ADE OM Flavor, Product No. 03066 | about 0.53-1.81 kgs |
| Liquid ANI-MOL-ADE OS Flavor, Product No. 01167 | about 0.53-1.36 kgs |

Many types of scented flavorings other than those listed in Table 4 can be used to mask the taste and scent of fish oil to enhance an animal's willingness to consume it. Preferably, the scented flavoring is in either powdered or liquid form prior to being mixed with the fish oil. Moreover, the scented flavoring is oil soluble so it can readily mix with the fish oil. Natural flavoring extracts, artificial flavoring extracts, or a combination of both can be used in the scented flavoring.

The scented flavoring is added to the fish oil and mixed by hand or by using a mixing machine (e.g., a blender) for about 3-5 minutes to evenly distribute the scented flavoring throughout the fish oil. The fish oil and the scented flavoring tend to mix readily together into a homogenous mixture. When either or both of additional dietary supplements and thickening agents are added to the fish oil, the scented flavoring can be added before, during, or after the additional dietary supplements and thickening agents are added to the fish oil. Preferably, the scented flavoring and the fish oil are at room temperature when combined—no heating or cooling is required. Combining the scented flavoring and fish oil together is similar to the process of mixing vegetable oil and a plant based scent such as garlic oil.

It will be obvious to skilled persons that many changes may be made to the details of the above-described embodiments without departing from the underlying principles of the invention. The scope of the present invention should, therefore, be determined only by the following claims.

The invention claimed is:

1. A method of enhancing palatability of a dietary supplement added to animal food to facilitate intake by a companion animal of the animal food containing the dietary supplement, comprising:

preparing for dispensing on animal food a viscous liquid blend of fish oil, dietary supplement in particulate form, and thickening agent dispersed in the fish oil, the fish oil included in an amount of between about 70 wt. % and about 93 wt. % of the viscous liquid blend, and the thickening agent dispersed in an amount of between about 7 wt. % and about 8.2 wt. % of the viscous liquid blend to thicken the fish oil to a viscosity causing protracted suspension of the dietary supplement in the fish oil and thereby enhancing the dispensability of the viscous liquid blend, and to at least partly encapsulate the dietary supplement by the thickened fish oil, the encapsulation masking, from the companion animal ingesting animal food containing the dietary supplement, one or both of smell and taste of the dietary supplement and thereby enhancing its palatability to the companion animal and facilitating intake by the companion animal of the animal food containing the dietary supplement.

2. The method of claim 1, further comprising dispensing the viscous liquid blend on the animal food, the viscous liquid blend forming for the animal food a viscous dietary covering containing fish oil that stays on the animal food and thereby induces the companion animal to ingest the viscous liquid blend.

3. The method of claim 2, in which the viscous liquid blend is held in a container and is dispensed on the animal food by pumping with a fluid displacement dispenser the viscous liquid blend out of the container and onto the animal food.

4. The method of claim 1, in which the thickening agent includes silica in an amount of between about 7 wt. % and about 8.2 wt. % of the viscous liquid blend.

5. The method of claim 4, in which the silica includes fumed silica.

6. The method of claim 1, in which the viscosity of the fish oil thickened by the thickening agent is in a range of between about 90 cP and about 250,000 cP at ambient temperature of the viscous liquid blend.

7. The method of claim 1, in which the dietary supplement includes glucosamine, chondroitin, probiotics, or prebiotics, or a combination of them.

8. The method of claim 7, in which the dietary supplement is included in an amount of between about 1.5 wt. % and about 22 wt. % of the viscous liquid blend.

9. The method of claim 4, in which the silica includes precipitated silica.

* * * * *